US008880483B2

(12) United States Patent
Gorobets

(10) Patent No.: US 8,880,483 B2
(45) Date of Patent: Nov. 4, 2014

(54) SYSTEM AND METHOD FOR IMPLEMENTING EXTENSIONS TO INTELLIGENTLY MANAGE RESOURCES OF A MASS STORAGE SYSTEM

(75) Inventor: Sergey A. Gorobets, Edinburgh (GB)

(73) Assignee: SanDisk Technologies Inc., Plano, TX (US)

(*) Notice: Subject to any disclaimer, the term of this patent is extended or adjusted under 35 U.S.C. 154(b) by 948 days.

(21) Appl. No.: 11/963,479

(22) Filed: Dec. 21, 2007

(65) Prior Publication Data

US 2009/0164705 A1    Jun. 25, 2009

(51) Int. Cl.
*G06F 17/30*    (2006.01)
*G06F 3/06*    (2006.01)

(52) U.S. Cl.
CPC ............ *G06F 3/0661* (2013.01); *G06F 3/0679* (2013.01); *G06F 3/061* (2013.01); *G06F 3/0659* (2013.01)
USPC ........................................................ 707/693

(58) Field of Classification Search
CPC .................... G06F 12/0246; G06F 2212/7202; G06F 11/141; G06F 2212/7201
See application file for complete search history.

(56) References Cited

U.S. PATENT DOCUMENTS

| | | | |
|---|---|---|---|
| 5,570,315 A | 10/1996 | Tanaka et al. | |
| 5,640,529 A * | 6/1997 | Hasbun | 711/103 |
| 5,774,397 A | 6/1998 | Endoh et al. | |
| 6,046,935 A | 4/2000 | Takeuchi et al. | |
| 6,148,354 A * | 11/2000 | Ban et al. | 710/301 |
| 6,373,746 B1 | 4/2002 | Takeuchi et al. | |
| 6,456,528 B1 | 9/2002 | Chen | |
| 6,522,580 B2 | 2/2003 | Chen et al. | |
| 6,763,424 B2 | 7/2004 | Conley | |
| 6,771,536 B2 | 8/2004 | Li et al. | |
| 6,781,877 B2 | 8/2004 | Cernea et al. | |
| 7,139,864 B2 | 11/2006 | Bennett | |
| 7,613,891 B2 * | 11/2009 | Rudelic | 711/163 |
| 2003/0014278 A1 | 1/2003 | Park et al. | |
| 2003/0109093 A1 | 6/2003 | Harari et al. | |
| 2003/0229753 A1 * | 12/2003 | Hwang | 711/103 |

(Continued)

FOREIGN PATENT DOCUMENTS

WO    WO 2007/076214 A2    7/2007

OTHER PUBLICATIONS

Co-pending U.S. Appl. No. 11/760,469, filed Jun. 8, 2007, entitled "Method of Interfacing a Host Operating Through a Logical Address Space With a Direct File Storage Medium".

(Continued)

*Primary Examiner* — Dinku Gebresenbet
(74) *Attorney, Agent, or Firm* — Brinks Gilson & Lione

(57) ABSTRACT

Systems and methods for implementing extensions to intelligently manage resources of a mass storage system are disclosed. Generally, a host sends an extension of an enabled set of extensions to a mass storage system that includes at least one of command sequence information, command information or file attribute information. The host additionally sends a host application command to the mass storage system that includes logical block address information associated with the at least one of command sequence information, command information or file attribute information of the extension. Based on the received extension, the mass storage system intelligently performs operations that efficiently manage the resources of the mass storage system to reduce the frequency of operations such as data consolidation operations, data collection operations, and data copy operations, thereby increasing the data programming and reading performance of the mass storage system.

45 Claims, 9 Drawing Sheets

(56) References Cited

U.S. PATENT DOCUMENTS

| | | | |
|---|---|---|---|
| 2005/0086421 A1* | 4/2005 | Nassar | 711/103 |
| 2005/0141312 A1 | 6/2005 | Sinclair | |
| 2005/0141313 A1 | 6/2005 | Gorobets | |
| 2005/0144357 A1 | 6/2005 | Sinclair | |
| 2005/0144358 A1 | 6/2005 | Conley | |
| 2005/0144363 A1 | 6/2005 | Sinclair | |
| 2005/0144365 A1 | 6/2005 | Gorobets | |
| 2005/0144367 A1 | 6/2005 | Sinclair | |
| 2005/0166087 A1 | 7/2005 | Gorobets | |
| 2006/0020744 A1 | 1/2006 | Sinclair | |
| 2006/0020745 A1 | 1/2006 | Conley | |
| 2006/0155920 A1 | 7/2006 | Smith | |
| 2006/0155921 A1 | 7/2006 | Gorobets | |
| 2006/0155922 A1 | 7/2006 | Gorobets | |
| 2006/0184718 A1* | 8/2006 | Sinclair et al. | 711/103 |
| 2006/0184719 A1 | 8/2006 | Sinclair | |
| 2006/0184720 A1 | 8/2006 | Sinclair et al. | |
| 2006/0184722 A1 | 8/2006 | Sinclair | |
| 2006/0184723 A1 | 8/2006 | Sinclair et al. | |
| 2007/0030734 A1 | 2/2007 | Sinclair et al. | |
| 2007/0033323 A1 | 2/2007 | Gorobets | |
| 2007/0033324 A1 | 2/2007 | Sinclair | |
| 2007/0033325 A1 | 2/2007 | Sinclair | |
| 2007/0033326 A1 | 2/2007 | Sinclair | |
| 2007/0033327 A1 | 2/2007 | Sinclair | |
| 2007/0033328 A1 | 2/2007 | Sinclair et al. | |
| 2007/0033329 A1 | 2/2007 | Sinclair et al. | |
| 2007/0033330 A1 | 2/2007 | Sinclair et al. | |
| 2007/0033331 A1 | 2/2007 | Sinclair et al. | |
| 2007/0033332 A1 | 2/2007 | Sinclair et al. | |
| 2007/0033373 A1 | 2/2007 | Sinclair | |
| 2007/0033374 A1 | 2/2007 | Sinclair et al. | |
| 2007/0033375 A1 | 2/2007 | Sinclair et al. | |
| 2007/0033376 A1 | 2/2007 | Sinclair et al. | |
| 2007/0033377 A1 | 2/2007 | Sinclair et al. | |
| 2007/0033378 A1 | 2/2007 | Sinclair et al. | |
| 2007/0086260 A1 | 4/2007 | Sinclair | |
| 2007/0088904 A1 | 4/2007 | Sinclair | |
| 2007/0136553 A1 | 6/2007 | Sinclair | |
| 2007/0136555 A1 | 6/2007 | Sinclair | |
| 2007/0143378 A1* | 6/2007 | Gorobets | 707/205 |
| 2007/0143532 A1 | 6/2007 | Gorobets | |
| 2007/0143570 A1 | 6/2007 | Gorobets | |
| 2007/0143571 A1 | 6/2007 | Sinclair | |
| 2007/0186032 A1 | 8/2007 | Sinclair | |

OTHER PUBLICATIONS

U.S. Appl. No. 11/616,242, filed Dec. 26, 2006, entitled "Use of a Direct Data File System With a Continuous Logical Address Space Interface".

U.S. Appl. No. 11/616,236, filed Dec. 26, 2006, entitled "System Using a Direct Data File System With a Continuous Logical Address Space Interface".

U.S. Appl. No. 11/616,231, filed Dec. 26, 2006, entitled "Configuration of Host LBA Interface With Flash Memory".

U.S. Appl. No. 11/616,228, filed Dec. 26, 2006, entitled "Host System With Direct Data File Interface Configurability".

U.S. Appl. No. 11/616,226, filed Dec. 26, 2006, entitled "Managing a LBA Interface in a Direct Data File Memory System".

U.S. Appl. No. 11/616,218, filed Dec. 26, 2006, entitled "Host System That Manages a LBA Interface With Flash Memory".

Frank Shu and Nathan Obr, "Data Set Management Commands Proposal for ATA8-ACS2," Microsoft Corporation, dated Dec. 12, 2007, Revision 6, pp. 1-7.

Written Opinion of the International Searching Authority issued on Jun. 22, 2010, for International Application No. PCT/US2008/0082957 (6 pages).

* cited by examiner

SYSTEM AND METHOD FOR IMPLEMENTING EXTENSIONS TO INTELLIGENTLY MANAGE RESOURCES OF A MASS STORAGE SYSTEM

CROSS-REFERENCE TO RELATED APPLICATIONS

Reference is made to the following United States patent applications pertaining to direct data file storage in flash memory systems:

1) Ser. No. 11/060,249, entitled "Direct Data File Storage in Flash Memories" (publication no. 2006-0184720 A1), Ser. No. 11/060,174, entitled "Direct File Data Programming and Deletion in Flash Memories" (publication no. 2006-0184718 A1), and Ser. No. 11/060,248, entitled "Direct Data File Storage Implementation Techniques in Flash Memories" (publication no. 2006-0184719 A1), all filed Feb. 16, 2005, and related application Ser. No. 11/342,170 (publication no. 2006-0184723 A1) and Ser. No. 11/342,168 (publication no. 2006-0184722 A1), both filed Jan. 26, 2006;

2) No. 60/705,388, filed Aug. 3, 2005, Ser. No. 11/461,997, entitled "Data Consolidation and Garbage Collection in Direct Data File Storage in Flash Memories," Ser. No. 11/462,007, entitled "Data Operations in Flash Memories Utilizing Direct Data File Storage," and related application Ser. Nos. 11/462,001 and 11/462,013, all filed Aug. 2, 2006.

3) Ser. No. 11/196,869, filed Aug. 3, 2005, entitled "Interfacing Systems Operating Through a Logical Address Space and on a Direct Data File Basis."

4) Ser. No. 11/196,168, filed Aug. 3, 2005, entitled "Method and System for Dual Mode Access for Storage Devices."

5) Ser. No. 11/250,299, entitled "Method of Storing Transformed Units of Data in a Memory System Having Fixed Sized Storage Blocks," and related application Ser. No. 11/250,794, both filed Oct. 13, 2005.

6) Ser. No. 11/259,423, entitled "Scheduling of Reclaim Operations in Non-Volatile Memory," and related application Ser. No. 11/259,439, both filed Oct. 25, 2005.

7) Ser. No. 11/302,764, entitled "Logically-Addressed File Storage Methods," and related application Ser. No. 11/300,568, both filed Dec. 13, 2005.

8) Ser. No. 11/316,577, entitled "Enhanced Host Interfacing Methods," and related application Ser. No. 11/316,578, both filed Dec. 21, 2005.

9) Ser. No. 11/314,842, filed Dec. 21, 2005, entitled "Dual Mode Access for Non-Volatile Storage Devices."

10) Ser. No. 11/313,567, entitled "Method and System for Accessing Non-Volatile Storage Devices," and related application Ser. No. 11/313,633, both filed Dec. 21, 2005.

11) Ser. No. 11/382,224, entitled "Management of Memory Blocks that Directly Store Data Files," and related application Ser. No. 11/382,228, both filed May 8, 2006.

12) Ser. No. 11/382,232, entitled "Reclaiming Data Storage Capacity in Flash Memories," and related application Ser. No. 11/382,235, both filed May 8, 2006.

13) No. 60/746,742, filed May 8, 2006, Ser. No. 11/459,255, entitled "Indexing of File Data in Reprogrammable Non-Volatile Memories that Directly Store Data Files," and related application Ser. No. 11/459,246, both filed Jul. 21, 2006.

14) No. 60/746,740, filed May 8, 2006, Ser. No. 11/459,268, entitled "Methods of Managing Blocks in Nonvolatile Memory," and related application Ser. No. 11/459,260, both filed Jul. 21, 2006.

15) Ser. No. 11/616,242, entitled "Use of a Direct Data File System with a Continuous Logical Address Space Interface", and related application Ser. Nos. 11/616,236; 11/616,231; 11/616,228; 11/616,226; and 11/616,218, all filed Dec. 26, 2006.

The above applications, collectively referred to herein as the "Direct Data File Storage Applications", and all patents, patent applications, articles and other publications, documents and things referenced subsequently herein are hereby incorporated by reference in their entirety for all purposes.

This application is also related to "System For Interfacing A Host Operating Through A Logical Address Space With A Direct File Storage Medium," U.S. patent application Ser. No. 11/760,480, filed Jun. 8, 2007, which is hereby incorporated by reference.

This application is also related to "System For Interfacing A Host Operating Through A Logical Address Space With A Direct File Storage Medium," U.S. patent application Ser. No. 11/760,469, filed Jun. 8, 2007, which is hereby incorporated by reference.

TECHNICAL FIELD

This application relates generally to data communication between electronic systems having different interfaces. More specifically, this application relates to the operation of memory systems, such as re-programmable non-volatile semiconductor flash memory, and a host device to which the memory is connected or connectable.

BACKGROUND

When writing data to a conventional flash data memory system, a host typically assigns unique logical addresses to sectors, clusters or other units of data within a continuous virtual address space of the memory system. The host writes data to, and reads data from, addresses within the logical address space of the memory system. The memory system then commonly maps data between the logical address space and the physical blocks or metablocks of the memory, where data is stored in fixed logical groups corresponding to ranges in the logical address space. Generally, each fixed logical group is stored in a separate physical block of the memory system. The memory system keeps track of how the logical address space is mapped into the physical memory but the host is unaware of this. The host keeps track of the addresses of its data files within the logical address space, but the memory system operates without knowledge of this mapping.

A drawback of memory systems that operate in a logical address space, also referred to as logical block address (LBA) format, is fragmentation. Data written by a host file system may often be fragmented in logical address space, where many fixed logical groups are only partially updated with new data. The fragmentation may occur as a result of cumulative fragmentation of free space by the host file system, and possibly even as a result of inherent fragmentation of individual files by the host file system. The fragmented logical groups will need to be rewritten in full in a different physical block. The process of rewriting the fragmented logical groups may involve copying unrelated data from the prior location of the logical group. This overhead can result in lower performance and reduced device lifetime for the memory system.

BRIEF SUMMARY

In order to address the need for improved memory system performance and to reduce fragmentation, a method for implementing extensions to intelligently manage resources of a mass storage system is set forth.

According to one aspect, a method for transferring data between a host system and a re-programmable non-volatile mass storage system is described. The method includes the mass storage system receiving an extension of an enabled set of extensions from a host system, the extension including at least one of command sequence information, command information or file attribute information. The mass storage system receives a host application command from the host system that includes logical block address information for data associated with the received at least one of command sequence information, command information or file attribute information. The mass storage system manages resources of the mass storage system based on the received extension of the enabled set of extensions.

According to another aspect, a computer-readable storage medium having executable instructions for transferring data between a host system and a re-programmable non-volatile mass storage system is described. The instructions are configured to direct a processor to perform acts of receiving an extension of an enabled set of extensions from a host system, the extension comprising at least one of command sequence information, command information or file attribute information; receiving a host application command from the host system, the host application command comprising logical block address information for data associated with the received at least one command sequence information, command information or file attribute information; and managing resources of the mass storage system based on the received extension of the enabled set of extensions.

According to yet another aspect, another method for transferring data between a host system and a re-programmable non-volatile mass storage system is described. The method includes a host system directing an extension of an enabled set of extensions to a mass storage system, the extension including at least one of command sequence information, command information or file attribute information. The method additionally includes the host system directing a host application command to the mass storage system, the host application command comprising logical block address information for data associated with the at least one of command sequence information, command information or file attribute information.

According to another aspect, another computer-readable storage medium having processor executable instructions for transferring data between a host system and a re-programmable non-volatile mass storage system is described. The instructions are configured to direct a processor to perform acts of directing an extension of an enabled set of extensions to a mass storage system, the extension comprising at least one of command sequence information, command information or file attribute information; and directing a host application command to the mass storage system, the host application command comprising logical block address information for data associated with at least one of command sequence information, command information or file attribute information.

According to yet another aspect a method for managing resources of a re-programmable non-volatile mass storage system is described. The method includes receiving an extension of an enabled set of extensions from a host system, the extension comprising command sequence information. The method further includes managing resources of the mass storage system based on the received extension comprising command sequence information to disregard at least one of data or host application commands associated with a previous command sequence that has not been completed.

According to another aspect, a computer-readable storage medium having processor executable instructions for managing resources of a re-programmable non-volatile mass storage system. The instructions are configured to direct a processor to perform acts of receiving an extension of an enabled set of extensions from a host system, the extension comprising command sequence information; and managing resources of the mass storage system based on the received extension comprising command sequence information to disregard at least one of data or host application commands associated with a previous command sequence that has not been completed.

Other features and advantages of the invention will become apparent upon review of the following drawings, detailed description and claims.

DETAILED DESCRIPTION

A flash memory system suitable for use in implementing aspects of the invention is shown in FIGS. 1-6. A host system 1 of FIG. 1 stores data into and retrieves data from a flash memory 2. Although in some implementations the flash memory can be embedded within the host, such as in the form of a solid state disk drive installed in a personal computer, the memory 2 is illustrated to be in the form of a card that is removably connected to the host through mating parts 3 and 4 of a mechanical and electrical connector. However, it should be appreciated that the methods described below for implementing extensions to intelligently manage resources of a mass storage system may be implemented in flash memory embedded within the host.

There are currently many different flash memory cards that are commercially available, examples being the CompactFlash (CF), the MultiMediaCard (MMC), Secure Digital (SD), miniSD, Memory Stick, SmartMedia, TransFlash cards, and xD card. Although each of these cards has a unique mechanical and/or electrical interface according to its standardized specifications, the flash memory system included in each is similar. These cards are all available from SanDisk Corporation, assignee of the present application. SanDisk also provides a line of flash drives under its Cruzer trademark, which are hand held memory systems in small packages that have a Universal Serial Bus (USB) plug for connecting with a host by plugging into the hosts USB receptacle. Each of these memory cards and flash drives includes controllers that interface with the host and control operation of the flash memory within them.

Host systems that use such memory cards and flash drives are many and varied. They include personal computers (PCs), laptop and other portable computers, cellular telephones, personal digital assistants (PDAs), digital still cameras, digital movie cameras and portable audio players. The host typically includes a built-in receptacle for one or more types of memory cards or flash drives but some require adapters into which a memory card is plugged. The memory system usually contains its own memory controller and drivers but there are also some memory-only systems that are instead controlled by software executed by the host to which the memory is connected. In some memory systems containing the controller, especially those embedded within a host, the memory, controller and drivers are often formed on a single integrated circuit chip.

Figure 1:
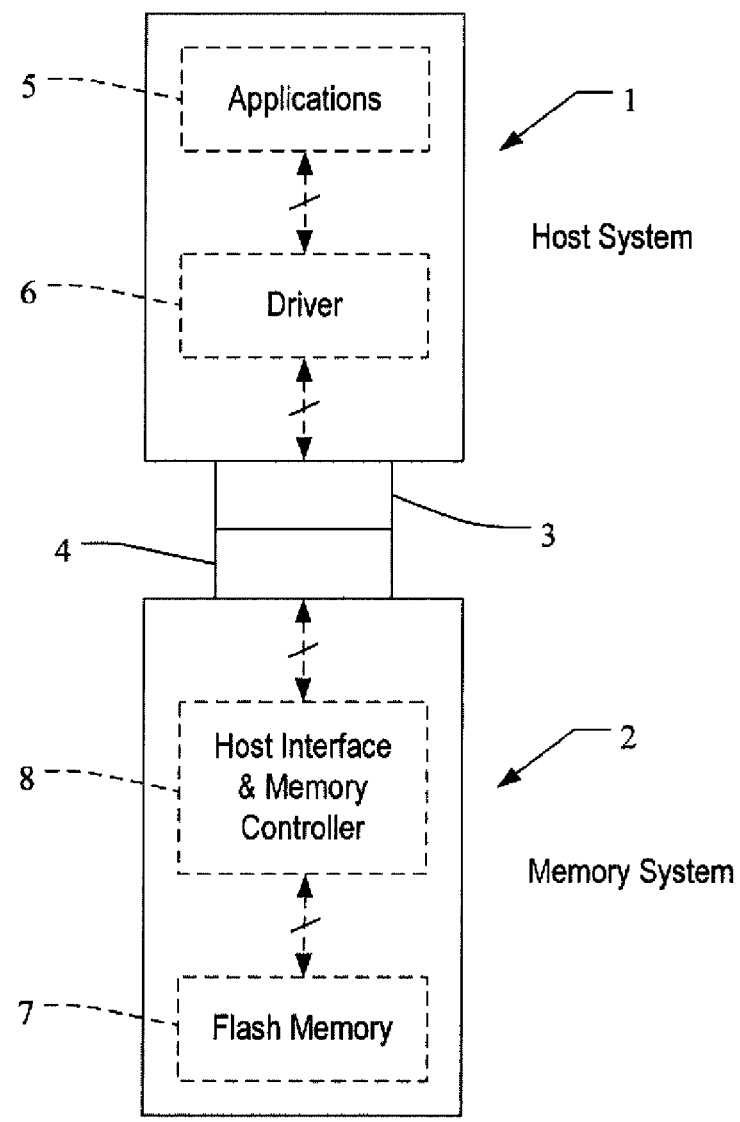
FIG. 1 schematically illustrates a host and a connected non-volatile memory system as currently implemented.

The host system 1 of FIG. 1 may be viewed as having two major parts, insofar as the memory 2 is concerned, made up of a combination of circuitry and software. They are an applications portion 5 and a driver portion 6 that interfaces with the memory 2. In a personal computer, for example, the applications portion 5 can include a processor running word processing, graphics, control or other popular application software. In a camera, cellular telephone or other host system that is primarily dedicated to performing a single set of functions, the applications portion 5 includes the software that operates the camera to take and store pictures, the cellular telephone to make and receive calls, and the like.

The memory system 2 of FIG. 1 includes flash memory 7, and circuits 8 that both interface with the host to which the card is connected for passing data back and forth and control the memory 7. The controller 8 typically converts between logical addresses of data used by the host 1 and physical addresses of the memory 7 during data programming and reading. While the controller 8 of FIG. 1 is shown to be part of the memory system 2, it should be appreciated that in memory systems such as SmartMedia, xD card or embedded media, the memory system 2 may not include a controller 8 and a controller of the host system acts as a controller for the memory system.

Figure 2:
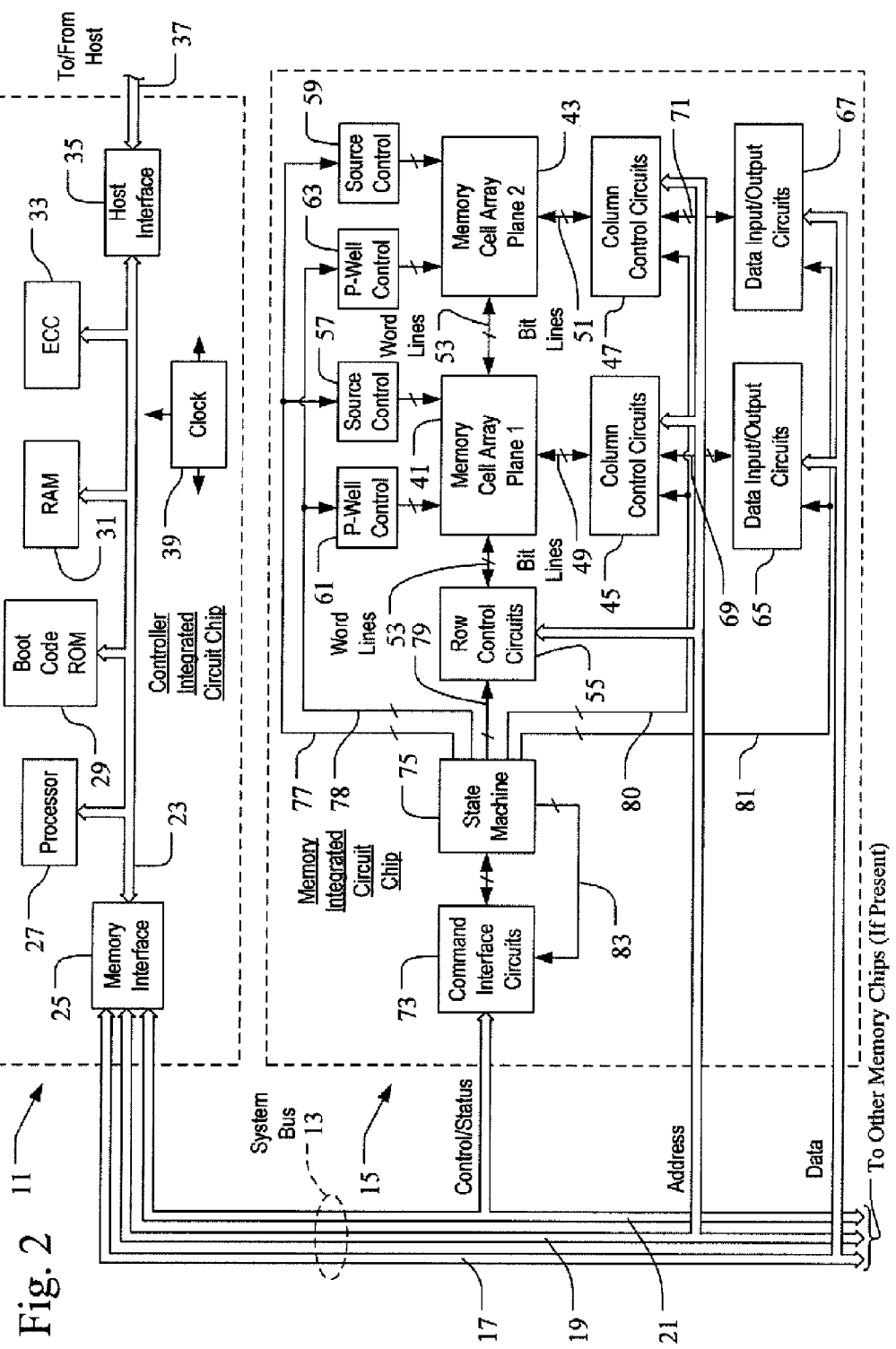
FIG. 2 is a block diagram of an example flash memory system for use as the non-volatile memory of FIG. 1.

Referring to FIG. 2, circuitry of a typical flash memory system that may be used as the non-volatile memory 2 of FIG. 1 is described. The system controller is usually implemented on a single integrated circuit chip 11 that is connected in parallel with one or more integrated circuit memory chips over a system bus 13, a single such memory chip 15 being shown in FIG. 2. The particular bus 13 that is illustrated includes a separate set of conductors 17 to carry data, a set 19 for memory addresses and a set 21 for control and status signals. Alternatively, a single set of conductors may be time shared between these three functions.

A typical controller chip 11 has its own internal bus 23 that interfaces with the system bus 13 through interface circuits 25. The primary functions normally connected to the bus are a processor 27 (such as a microprocessor or micro-controller), a read-only-memory (ROM) 29 containing code to initialize ("boot") the system, read-only-memory (RAM) 31 used primarily to buffer data being transferred between the memory and a host, and circuits 33 that calculate and check an error correction code (ECC) for data passing through the controller between the memory and the host. The controller bus 23 interfaces with a host system through circuits 35, which, in the case of the system of FIG. 2 being contained within a memory card, is done through external contacts 37 of the card that are part of the connector 4. A clock 39 is connected with and utilized by each of the other components of the controller 11.

The memory chip 15, as well as any other connected with the system bus 13, may contain an array of memory cells organized into multiple sub-arrays or planes, two such planes 41 and 43 being illustrated for simplicity but more, such as four or eight such planes, may instead be used. Alternatively, the memory cell array of the chip 15 may not be divided into planes. When so divided, however, each plane has its own column control circuits 45 and 47 that are operable independently of each other. The circuits 45 and 47 receive addresses of their respective memory cell array from the address portion 19 of the system bus 13, and decode them to address a specific one or more of respective bit lines 49 and 51. The word lines 53 are addressed through row control circuits 55 in response to addresses received on the address bus 19. Source voltage control circuits 57 and 59 are also connected with the respective planes, as are p-well voltage control circuits 61 and 63. If the memory chip 15 has a single array of memory cells, and if two or more such chips exist in the system, the array of each chip may be operated similarly to a plane or sub-array within the multi-plane chip described above.

Data are transferred into and out of the planes 41 and 43 through respective data input/output circuits 65 and 67 that are connected with the data portion 17 of the system bus 13. The circuits 65 and 67 provide for both programming data into the memory cells and for reading data from the memory cells of their respective planes, through lines 69 and 71 connected to the planes through respective column control circuits 45 and 47.

Although the controller 11 controls the operation of the memory chip 15 to program data, read data, erase and attend to various housekeeping matters, each memory chip also contains some controlling circuitry that executes commands from the controller 11 to perform such functions. Interface circuits 73 are connected to the control and status portion 21 of the system bus 13. Commands from the controller are provided to a state machine 75 that then provides specific control of other circuits in order to execute these commands. Control lines 77-81 connect the state machine 75 with these other circuits as shown in FIG. 2. Status information from the state machine 75 is communicated over lines 83 to the interface 73 for transmission to the controller 11 over the bus portion 21.

A NAND architecture of the memory cell arrays 41 and 43 is currently preferred, although other architectures, such as NOR, can also be used instead. Examples of NAND flash memories and their operation as part of a memory system may be had by reference to U.S. Pat. Nos. 5,570,315, 5,774,397, 6,046,935, 6,373,746, 6,456,528, 6,522,580, 6,771,536 and 6,781,877 and United States patent application publication no. 2003/0147278.

Figure 3:
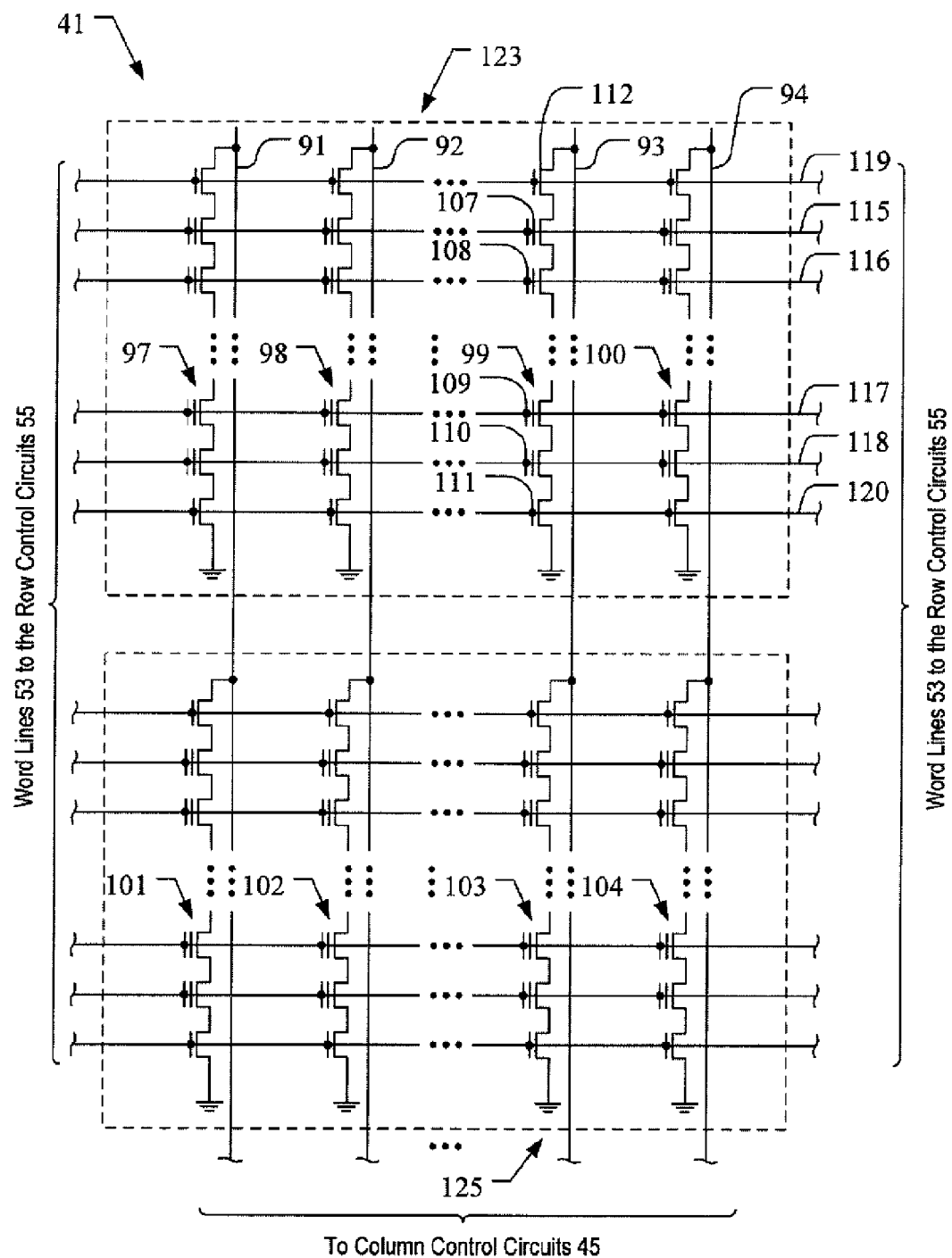
FIG. 3 is a representative circuit diagram of a memory cell array that may be used in the system of FIG. 2.

An example NAND array is illustrated by the circuit diagram of FIG. 3, which is a portion of the memory cell array 41 of the memory system of FIG. 2. A large number of global bit lines are provided, only four such lines 91-94 being shown in FIG. 2 for simplicity of explanation. A number of series connected memory cell strings 97-104 are connected between one of these bit lines and a reference potential. Using the memory cell string 99 as representative, a plurality of charge storage memory cells 107-110 are connected in series with select transistors 111 and 112 at either end of the string. When the select transistors of a string are rendered conductive, the string is connected between its bit line and the reference potential. One memory cell within that string is then programmed or read at a time.

Word lines 115-118 of FIG. 3 individually extend across the charge storage element of one memory cell in each of a number of strings of memory cells, and gates 119 and 120 control the states of the select transistors at each end of the strings. The memory cell strings that share common word and control gate lines 115-120 are made to form a block 123 of memory cells that are erased together. This block of cells contains the minimum number of cells that are physically erasable at one time. One row of memory cells, those along one of the word lines 115-118, are programmed at a time. Typically, the rows of a NAND array are programmed in a prescribed order, in this case beginning with the row along the word line 118 closest to the end of the strings connected to ground or another common potential. The row of memory cells along the word line 117 is programmed next, and so on, throughout the block 123. The row along the word line 115 is programmed last.

A second block 125 is similar, its strings of memory cells being connected to the same global bit lines as the strings in the first block 123 but having a different set of word and control gate lines. The word and control gate lines are driven to their proper operating voltages by the row control circuits 55. If there is more than one plane or sub-array in the system, such as planes 1 and 2 of FIG. 2, one memory architecture uses common word lines extending between them. There can alternatively be more than two planes or sub-arrays that share common word lines. In other memory architectures, the word lines of individual planes or sub-arrays are separately driven.

As described in several of the NAND patents and published application referenced above, the memory system may be operated to store more than two detectable levels of charge in each charge storage element or region, thereby to store more than one bit of data in each. The charge storage elements of the memory cells are most commonly conductive floating gates but may alternatively be non-conductive dielectric charge trapping material, as described in U.S. patent application publication no. 2003/0109093.

Figure 4:
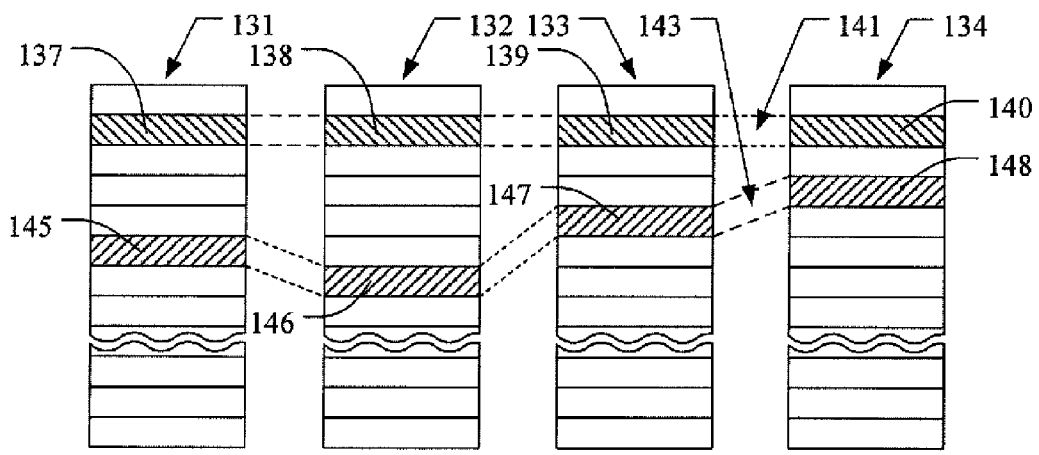
FIG. 4 illustrates an example physical memory organization of the system of FIG. 2.

FIG. 4 conceptually illustrates an organization of the flash memory cell array 7 (FIG. 1) that is used as an example in further descriptions below. Four planes or sub-arrays 131-134 of memory cells may be on a single integrated memory cell chip, on two chips (two of the planes on each chip) or on four separate chips. The specific arrangement is not important to the discussion below. Of course, other numbers of planes, such as 1, 2, 8, 16 or more may exist in a system. The planes are individually divided into blocks of memory cells shown in FIG. 4 by rectangles, such as blocks 137, 138, 139 and 140, located in respective planes 131-134. There can be dozens or hundreds of blocks in each plane.

As mentioned above, the block of memory cells is the unit of erase, the smallest number of memory cells that are physically erasable together. For increased parallelism, however, the blocks are operated in larger metablock units. One block from each plane is logically linked together to form a metablock. The four blocks 137-140 are shown to form one metablock 141. All of the cells within a metablock are typically erased together. The blocks used to form a metablock need not be restricted to the same relative locations within their respective planes, as is shown in a second metablock 143 made up of blocks 145-148. Although it is usually preferable to extend the metablocks across all of the planes, for high system performance, the memory system can be operated with the ability to dynamically form metablocks of any or all of one, two or three blocks in different planes. This allows the size of the metablock to be more closely matched with the amount of data available for storage in one programming operation.

Figure 5:
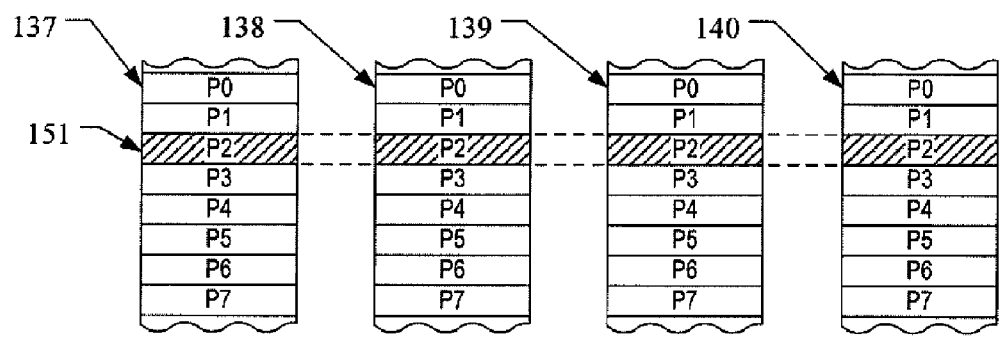
FIG. 5 shows an expanded view of a portion of the physical memory of FIG. 4.

The individual blocks are in turn divided for operational purposes into pages of memory cells, as illustrated in FIG. 5. The memory cells of each of the blocks 137-140, for example, are each divided into eight pages P0-P7. Alternatively, there may be 16, 32 or more pages of memory cells within each block. The page is the unit of data programming and reading within a block, containing the minimum amount of data that are programmed or read at one time. In the NAND architecture of FIG. 3, a page is formed of memory cells along a word line within a block. However, in order to increase the memory system operational parallelism, such pages within two or more blocks may be logically linked into metapages. A metapage 151 is illustrated in FIG. 5, being formed of one physical page from each of the four blocks 137-140. The metapage 151, for example, includes the page P2 in of each of the four blocks but the pages of a metapage need not necessarily have the same relative position within each of the blocks. A metapage is the maximum unit of programming.

Although it is preferable to program and read the maximum amount of data in parallel across all four planes, for high system performance, the memory system can also be operated to form metapages of any or all of one, two or three pages in separate blocks in different planes. This allows the programming and reading operations to adaptively match the amount of data that may be conveniently handled in parallel and reduces the occasions when part of a metapage remains unprogrammed with data.

A metapage formed of physical pages of multiple planes, as illustrated in FIG. 5, contains memory cells along word line rows of those multiple planes. Rather than programming all of the cells in one word line row at the same time, they are more commonly alternately programmed in two or more interleaved groups, each group storing a page of data (in a single block) or a metapage of data (across multiple blocks). By programming alternate memory cells at one time, a unit of peripheral circuits including data registers and a sense amplifier need not be provided for each bit line but rather are time-shared between adjacent bit lines. This economizes on the amount of substrate space required for the peripheral circuits and allows the memory cells to be packed with an increased density along the rows. Otherwise, it is preferable to simultaneously program every cell along a row in order to maximize the parallelism available from a given memory system.

With reference to FIG. 3, the simultaneous programming of data into every other memory cell along a row is most conveniently accomplished by providing two rows of select transistors (not shown) along at least one end of the NAND strings, instead of the single row that is shown. The select transistors of one row then connect every other string within a block to their respective bit lines in response to one control signal, and the select transistors of the other row connect intervening every other string to their respective bit lines in response to another control signal. Two pages of data are therefore written into each row of memory cells.

Figure 6:
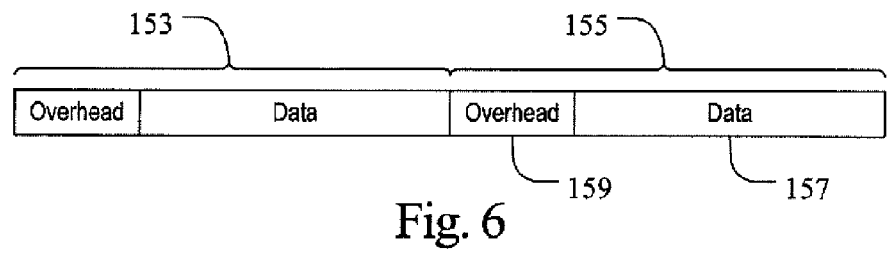
FIG. 6 shows a further expanded view of a portion of the physical memory of FIGS. 4 and 5.

The amount of data in each logical page is typically an integer number of one or more sectors of data, each sector containing 512 bytes of data, by convention. The sector is the minimum unit of data transferred to and from the memory system. FIG. 6 shows a logical data page of two sectors 153 and 155 of data of a page or metapage. Each sector usually contains a portion 157 of 512 bytes of user or system data being stored and another number of bytes 159 for overhead data related either to the data in the portion 157 or to the physical page or block in which it is stored. The number of bytes of overhead data is typically 16 bytes, making the total 528 bytes for each of the sectors 153 and 155. The overhead portion 159 may contain an ECC calculated from the data portion 157 during programming, its logical address, an experience count of the number of times the block has been erased and re-programmed, one or more control flags, operating voltage levels, and/or the like, plus an ECC calculated from such overhead data 159. Alternatively, the overhead data 159, or a portion of it, may be stored in different pages in other blocks. In either case, a sector denotes a unit of stored data with which an ECC is associated.

As the parallelism of memories increases, data storage capacity of the metablock increases and the size of the data page and metapage also increase as a result. The data page may then contain more than two sectors of data. With two sectors in a data page, and two data pages per metapage, there are four sectors in a metapage. Each metapage thus stores 2048 bytes of data. This is a high degree of parallelism, and can be increased even further as the number of memory cells in the rows is increased. For this reason, the width of flash memories is being extended in order to increase the amount of data in a page and a metapage.

The physically small re-programmable non-volatile memory cards and flash drives identified above are commercially available with various data storage capacities. The host manages data files generated or used by application software or firmware programs executed by the host. Word processing data files and drawing files of computer aided design (CAD) software are examples of data files generated by application software in general computer hosts such as PCs, laptop computers and the like. A digital camera generates a data file for each picture that is stored on a memory card. A cellular telephone utilizes data from files on an internal memory card, such as a telephone directory. A PDA stores and uses several different files, such as an address file, a calendar file, and the like. In any such application, the memory card may also contain software that operates the host.

Figure 7:
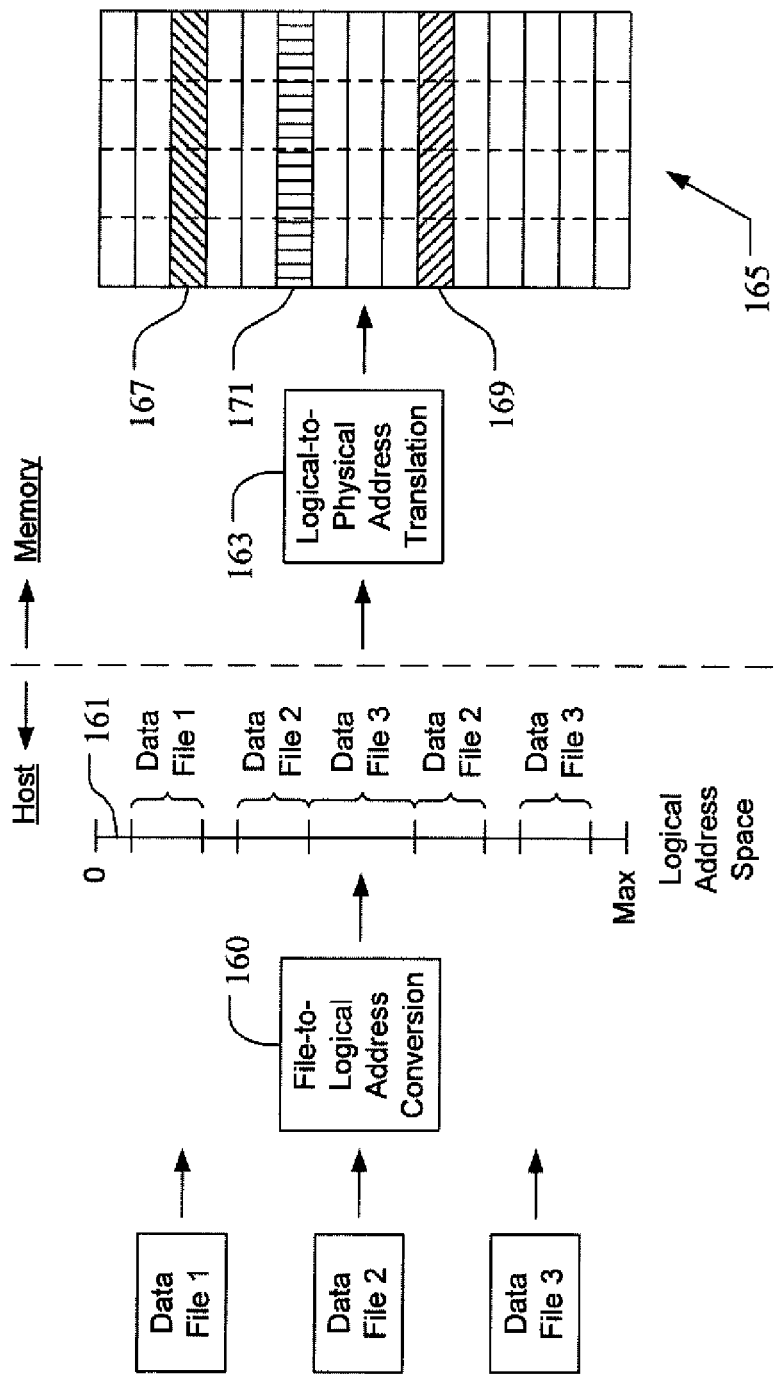
FIG. 7 illustrates a logical address space interface between a host and a re-programmable memory system.

A common logical interface between the host and the memory system is illustrated in FIG. 7. A continuous logical address space 161 is large enough to provide addresses for all the data that may be stored in the memory system. The host address space is typically divided into increments of clusters of data. Each cluster may be designed in a given host system to contain a number of sectors of data, somewhere between 4 and 64 sectors being typical. A standard sector contains 512 bytes of data.

Three Data Files 1, 2 and 3 are shown in the example of FIG. 7 to have been created. An application program running on the host system creates each file as an ordered set of data and identifies it by a unique name or other reference. Enough available logical address space not already allocated to other files is assigned by the host to Data File 1, by a file-to-logical address conversion 160. Data File 1 is shown to have been assigned a contiguous range of available logical addresses. Ranges of addresses are also commonly allocated for specific purposes, such as a particular range for the host operating software, which are then avoided for storing data even if these addresses have not been utilized at the time the host is assigning logical addresses to the data.

When a Data File 2 is later created by the host, the host similarly assigns two different ranges of contiguous addresses within the logical address space 161, by the file-to-logical address conversion 160 of FIG. 7. A file need not be assigned contiguous logical addresses but rather can be fragments of addresses in between address ranges already allocated to other files. This example then shows that yet another Data File 3 created by the host is allocated other portions of the host address space not previously allocated to the Data Files 1 and 2 and other data.

The host keeps track of the memory logical address space by maintaining a file allocation table (FAT), where the logical addresses assigned by the host to the various host files by the conversion 160 are maintained. The FAT table is frequently updated by the host as new files are stored, other files deleted, files modified and the like. The FAT table is typically stored in a host memory, with a copy also stored in the non-volatile memory that is updated from time to time. The copy is typically accessed in the non-volatile memory through the logical address space just like any other data file. When a host file is deleted, the host then deallocates the logical addresses previously allocated to the deleted file by updating the FAT table to show that they are now available for use with other data files.

The host is not concerned about the physical locations where the memory system controller chooses to store the files. The typical host only knows its logical address space and the logical addresses that it has allocated to its various files. The memory system, on the other hand, through the typical host/card interface being described, only knows the portions of the logical address space to which data have been written but does not know the logical addresses allocated to specific host files, or even the number of host files. The memory system controller converts the logical addresses provided by the host for the storage or retrieval of data into unique physical addresses within the flash memory cell array where host data are stored. A block 163 represents a working table of these logical-to-physical address conversions, which is maintained by the memory system controller.

The memory system controller is programmed to store data within the blocks and metablocks of a memory array 165 in a manner to maintain the performance of the system at a high level. Four planes or sub-arrays are used in this illustration. Data are preferably programmed and read with the maximum degree of parallelism that the system allows, across an entire metablock formed of a block from each of the planes. At least one metablock 167 is usually allocated as a reserved block for storing operating firmware and data used by the memory controller. Another metablock 169, or multiple metablocks, may be allocated for storage of host operating software, the host FAT table and the like. Most of the physical storage space remains for the storage of data files. The memory controller does not know, however, how the data received has been allocated by the host among its various file objects. All the memory controller typically knows from interacting with the host is that data written by the host to specific logical addresses are stored in corresponding physical addresses as maintained by the controller's logical-to-physical address table 163.

In a typical memory system, a few extra blocks of storage capacity are provided than are necessary to store the amount of data within the address space 161. One or more of these extra blocks may be provided as redundant blocks for substitution for other blocks that may become defective during the lifetime of the memory. The logical grouping of blocks contained within individual metablocks may usually be changed for various reasons, including the substitution of a redundant block for a defective block originally assigned to the metablock. One or more additional blocks, such as metablock 171, are typically maintained in an erased block pool. Most of the remaining metablocks shown in FIG. 7 are used to store host data. When the host writes data to the memory system, the function 163 of the controller converts the logical addresses assigned by the host to physical addresses within a metablock in the erased block pool. Other metablocks not being used to store data within the logical address space 161 are then erased and designated as erased pool blocks for use during a subsequent data write operation. In a preferred form, the logical address space is divided into logical groups that each contain an amount of data equal to the storage capacity of a physical memory metablock, thus allowing a one-to-one mapping of the logical groups into the metablocks.

Data stored at specific host logical addresses are frequently overwritten by new data as the original stored data become obsolete. The memory system controller, in response, writes the new data in an erased block and then changes the logical-to-physical address table for those logical addresses to identify the new physical block to which the data at those logical addresses are stored. The blocks containing the original data at those logical addresses are then erased and made available for the storage of new data. Such erasure often must take place before a current data write operation may be completed if there is not enough storage capacity in the pre-erased blocks from the erase block pool at the start of writing. This can adversely impact the system data programming speed. The memory controller typically learns that data at a given logical address has been rendered obsolete by the host only when the host writes new data to their same logical address. Many blocks of the memory can therefore be storing such invalid data for a time.

The sizes of blocks and metablocks are increasing in order to efficiently use the area of the integrated circuit memory chip. This results in a large proportion of individual data writes storing an amount of data that is less than the storage capacity of a metablock, and in many cases even less than that of a block. Since the memory system controller normally directs new data to an erased pool metablock, this can result in portions of metablocks going unfilled. If the new data are updates of some data stored in another metablock, remaining valid metapages of data from that other metablock having logical addresses contiguous with those of the new data metapages are also desirably copied in logical address order into the new metablock. The old metablock may retain other valid data melapages. This results over time in data of certain metapages of an individual metablock being rendered obsolete and invalid, and replaced by new data with the same logical address being written to a different metablock.

In order to maintain enough physical memory space to store data over the entire logical address space 161, such data are periodically compacted or consolidated (garbage collection). It is also desirable to maintain sectors of data within the metablocks in the same order as their logical addresses as much as practical, since this makes reading data in contiguous logical addresses more efficient. So data compaction and garbage collection are typically performed with this additional goal. Some aspects of managing a memory when receiving partial block data updates and the use of metablocks are described in U.S. Pat. No. 6,763,424.

Data compaction typically involves reading all valid data metapages from a metablock and writing them to a new block, ignoring metapages with invalid data in the process. The metapages with valid data are also preferably arranged with a physical address order that matches the logical address order of the data stored in them. The number of metapages occupied in the new metablock will be less than those occupied in the old metablock since the metapages containing invalid data are not copied to the new metablock. The old block is then erased and made available to store new data. The additional metapages of capacity gained by the consolidation can then be used to store other data.

During garbage collection, metapages of valid data with contiguous or near contiguous logical addresses are gathered from two or more metablocks and re-written into another metablock, usually one in the erased block pool. When all valid data metapages are copied from the original two or more metablocks, they may be erased for future use.

Data consolidation and garbage collection take time and can affect the performance of the memory system, particularly if data consolidation or garbage collection needs to take place before a command from the host can be executed. Such operations are normally scheduled by the memory system controller to take place in the background as much as possible but the need to perform these operations can cause the controller to have to give the host a busy status signal until such an operation is completed. An example of where execution of a host command can be delayed is where there are not enough pre-erased metablocks in the erased block pool to store all the data that the host wants to write into the memory, so data consolidation or garbage collection is needed first to clear one or more metablocks of valid data, which can then be erased. Attention has therefore been directed to managing control of the memory in order to minimize such disruptions. Many such techniques are described in the following United States patent applications, referenced hereinafter as the "LBA Patent Applications": Ser. No. 10/749,831, filed Dec. 30, 2003, entitled "Management of Non-Volatile Memory Systems Having Large Erase Blocks"; Ser. No. 10/750,155, filed Dec. 30, 2003, entitled "Non-Volatile Memory and Method with Block Management System"; Ser. No. 10/917,888, filed Aug. 13, 2004, entitled "Non-Volatile Memory and Method with Memory Planes Alignment"; Ser. No. 10/917,867, filed Aug. 13, 2004; Ser. No. 10/917,889, filed Aug. 13, 2004, entitled "Non-Volatile Memory and Method with Phased Program Failure Handling"; Ser. No. 10/917,725, filed Aug. 13, 2004, entitled "Non-Volatile Memory and Method with Control Data Management"; Ser. No. 11/192,220, filed Jul. 27, 2005, entitled "Non-Volatile Memory and Method with Multi-Stream Update Tracking"; Ser. No. 11/192,386, filed Jul. 27, 2005, entitled "Non-Volatile Memory and Method with Improved Indexing for Scratch Pad and Update Blocks"; and Ser. No. 11/191,686, filed Jul. 27, 2005, entitled "Non-Volatile Memory and Method with Multi-Stream Updating".

One challenge to efficiently controlling operation of memory arrays with very large erase blocks is to match and align the number of data sectors being stored during a given write operation with the capacity and boundaries of blocks of memory. One approach is to configure a metablock used to store new data from the host with less than a maximum number of blocks, as necessary to store a quantity of data less than an amount that fills an entire metablock. The use of adaptive metablocks is described in U.S. patent application Ser. No. 10/749,189, filed Dec. 30, 2003, entitled "Adaptive Metablocks." The fitting of boundaries between blocks of data and physical boundaries between metablocks is described in patent application Ser. No. 10/841,118, filed May 7, 2004, and Ser. No. 11/016,271, filed Dec. 16, 2004, entitled "Data Run Programming."

The memory controller may also use data from the FAT table, which is stored by the host in the non-volatile memory, to more efficiently operate the memory system. One such use is to learn when data has been identified by the host to be obsolete by deallocating their logical addresses. Knowing this allows the memory controller to schedule erasure of the blocks containing such invalid data before it would normally learn of it by the host writing new data to those logical addresses. This is described in U.S. patent application Ser. No. 10/897,049, filed Jul. 21, 2004, entitled "Method and Apparatus for Maintaining Data on Non-Volatile Memory Systems." Other techniques include monitoring host patterns of writing new data to the memory in order to deduce whether a given write operation is a single file, or, if multiple files, where the boundaries between the files lie. U.S. patent application Ser. No. 11/022,369, filed Dec. 23, 2004, entitled "FAT Analysis for Optimized Sequential Cluster Management," describes the use of techniques of this type.

Figure 8:
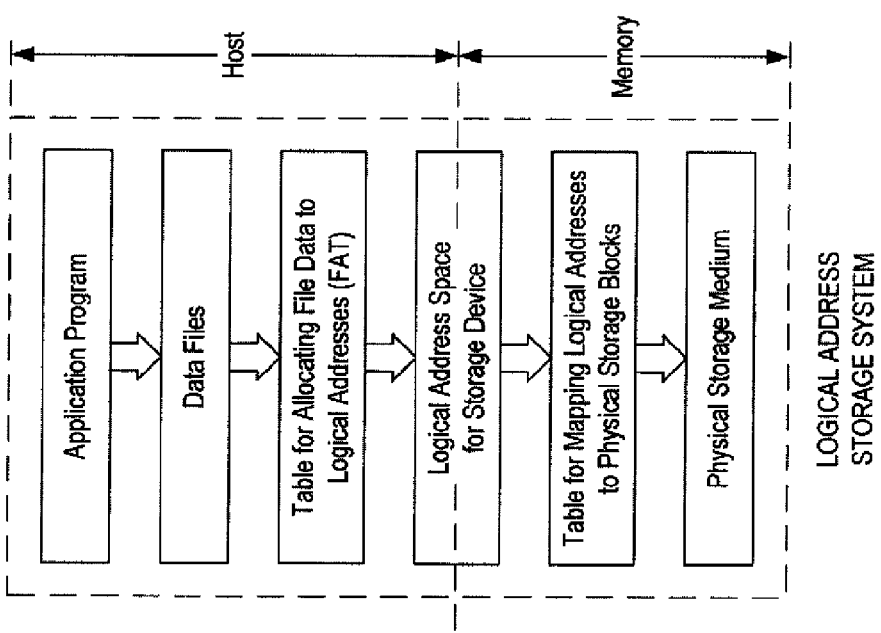
FIG. 8 illustrates in a different manner than FIG. 7 a logical address space interface between a host and a re-programmable memory system.

To operate the memory system efficiently, it is desirable for the controller to know as much about the logical addresses assigned by the host to data of its individual files as it can, and for the controller to know as much about host application command sequences or host application commands sent to the memory system as it can. Based on this information, data files can then be stored by the controller within a single metablock or group of metablocks, rather than being scattered among a larger number of metablocks when file boundaries are not known. The result is that the number and complexity of data consolidation and garbage collection operations are reduced. The performance of the memory system improves as a result. But it is difficult for the memory controller to know much about the host data file structure, host application commands, and/or sequences of host application commands, when the host/memory interface includes the logical address space 161 (FIG. 7), as described above. Referring to FIG. 8, the typical logical address host/memory interface as already shown in FIG. 7 is illustrated differently. The host generated data files are allocated logical addresses by the host. The memory system then sees these logical addresses and maps them into physical addresses of blocks of memory cells where the data are actually stored.

A different type of interface between the host and memory system, termed a direct data file interface, also referred to as direct file storage (DFS), does not use the logical address space. The host instead logically addresses each file by a unique number, or other identifying reference, and offset addresses of units of data (such as bytes) within the file. This file address is given directly by the host to the memory system controller, which then keeps its own table of where the data of each host file are physically stored. This new interface can be implemented with the same memory system as described above with respect to FIGS. 2-6. The primary difference with what is described above is the manner in which that memory system communicates with a host system.

Figure 9:
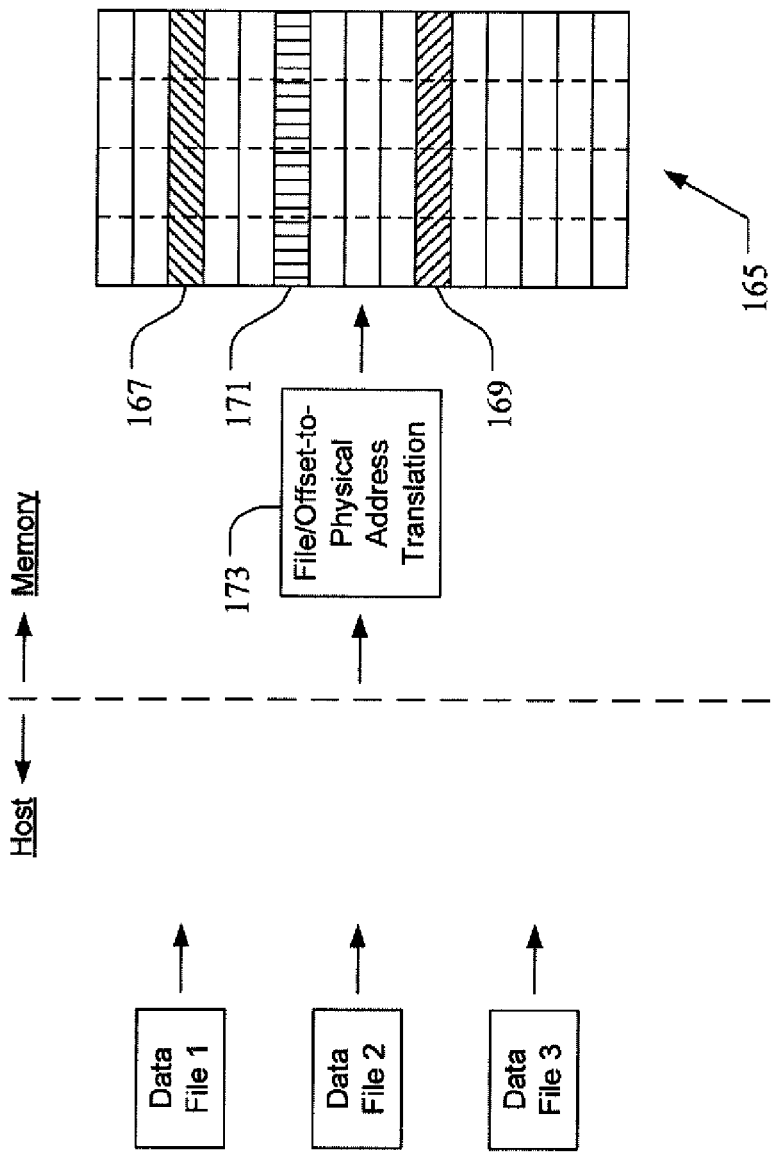
FIG. 9 illustrates a direct data file storage interface between a host and a re-programmable memory system.

A DFS file interface is illustrated in FIG. 9, which may be compared with the logical address interface of FIG. 7. An identification of each of the Files 1, 2 and 3 and offsets of data within the files of FIG. 9 are passed directly from the host to the memory controller. This logical file address information is then translated by a memory controller function 173 into physical addresses of metablocks and metapages of the memory 165. A file directory keeps track of the host file to which each stored sector or other unit of data belongs.

Figure 10:
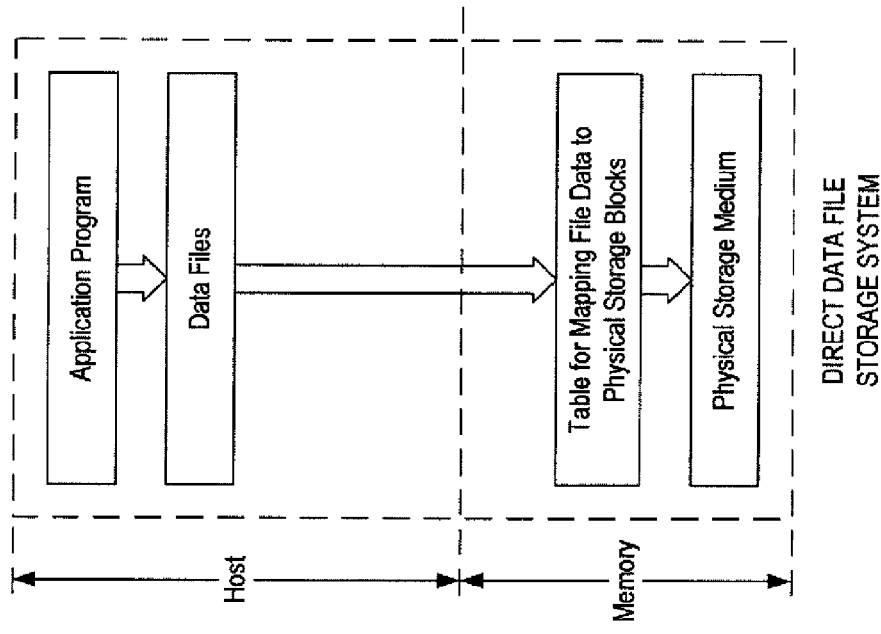
FIG. 10 illustrates, in a different manner than FIG. 9, a direct data file storage interface between a host and a re-programmable memory system.

The direct data file interface is also illustrated by FIG. 10, which should be compared with the logical address interface of FIG. 8. The logical address space and host maintained FAT table of FIG. 8 are not present in FIG. 10. Rather, data files generated by the host are identified to the memory system by file number and offsets of data within the file. The memory system controller then directly maps the files to the physical blocks of the memory cell array and maintains directory and index table information of the memory blocks into which host files are stored. It is then unnecessary for the host to maintain the file allocation table (FAT) that is currently necessary for managing a logical address interface.

Because the memory system knows the locations of data making up each file, these data may be erased soon after a host deletes the file. This is not possible with a typical logical address interface. Further, by identifying host data by file objects instead of using logical addresses, the memory system controller can store the data in a manner that reduces the need for frequent data consolidation and collection. The frequency of data copy operations and the amount of data copied are thus significantly reduced, thereby increasing the data programming and reading performance of the memory system.

Direct data file storage memory systems are described in the Direct Data File Storage Applications identified above. The direct data file interface of these Direct Data File Storage Applications, as illustrated by FIGS. 9 and 10, is simpler than the logical address space interface described above, as illustrated by FIGS. 7 and 8, and allows for improved memory system performance. Although the direct data file storage may be preferred for many applications, host systems are primarily configured at the present time to operate with the logical address space interface. Thus, a memory system with a direct data file interface may not be compatible with most hosts. It is therefore desirable to provide a memory system configured to use a DFS memory management format with the ability to operate with a legacy LBA interface.

In order to intelligently manage resources of a mass storage system when a host operates in a logical address space using methods such as those descried above with respect to DFS memory management, the host may send one or more extensions to a mass storage system before, or after, sending a host application command associated with the one or more extensions to the mass storage system. The one or more extensions indicate to the mass storage system information such as specific host application commands, specific sequences of host application commands, or specific files associated with host application commands or sequences of host application commands, that have been sent, or will be sent, to the mass storage system. Using this information, the mass storage system may intelligently perform operations that efficiently manage the resources of the mass storage system by reducing the frequency of operations such as data consolidation operations, data collection operations, and data copy operations, thereby increasing the data programming and reading performance of the memory system.

Figure 11:
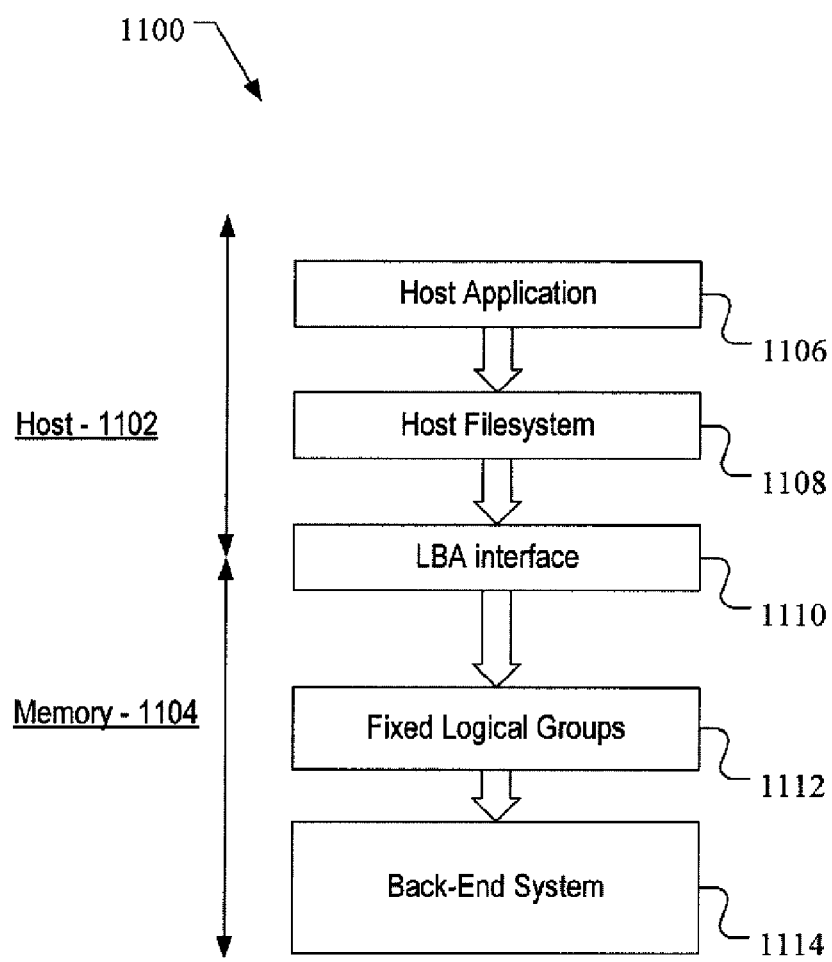
FIG. 11 is a block diagram of one embodiment of a system for implementing extensions to intelligently manage resources of a mass storage system.

FIG. 11 is a block diagram of one embodiment of a system 1100 for transferring data between a host system 1102 and a re-programmable non-voltage mass storage system 1104 that implements extensions to intelligently manage resources of the mass storage system 1104. The system 1100 may include a host application 1106, a host filesystem 1108, a LBA interface 1110, fixed logical groups 1112, and a back-end system 1114.

As explained in more detail below, to enable the mass storage system 1104 to intelligently manage its resources, the host system 1102 sends one or more extensions to the mass storage system 1104 that include at least one of command sequence information, command information or file attribute information. The mass storage system 1104 analyzes the received at least one of command sequence information, command information or file attribute information within the one or more extensions, and based on the analysis of the received at least one of command sequence information, command information or file attribute information, efficiently manages resources of the mass storage system to reduce the frequency of operations such as data consolidation operations, data collection operations, and data copy operations.

Command sequence information indicates to the mass storage system 1104 that the host system 1102 has sent, or will send, a specific sequence of host application commands to the mass storage system 1104. Command information indicates to the mass storage system 1104 that the host system 1102 has sent, or will send, a specific host application command to the mass storage system 1104. File attribute information is information such as a filename, a data type, a size of a file or a logical lock address of a file, that indicates a specific file associated with a host application command or a sequence of host application commands that the host system 1102 has sent, or will send, to the mass storage system 1104.

As shown in FIG. 11, the host filesystem 1108 may bypass the LBA interface 1110 and fixed logical groups 1112 to send the one or more extensions to the back-end system 1114. However in other implementations, the host filesystem 1108 does not bypass the LBA interface 1110 and fixed logical groups 1112 to send the one or more extensions to the back-end system 1114.

Figure 12:
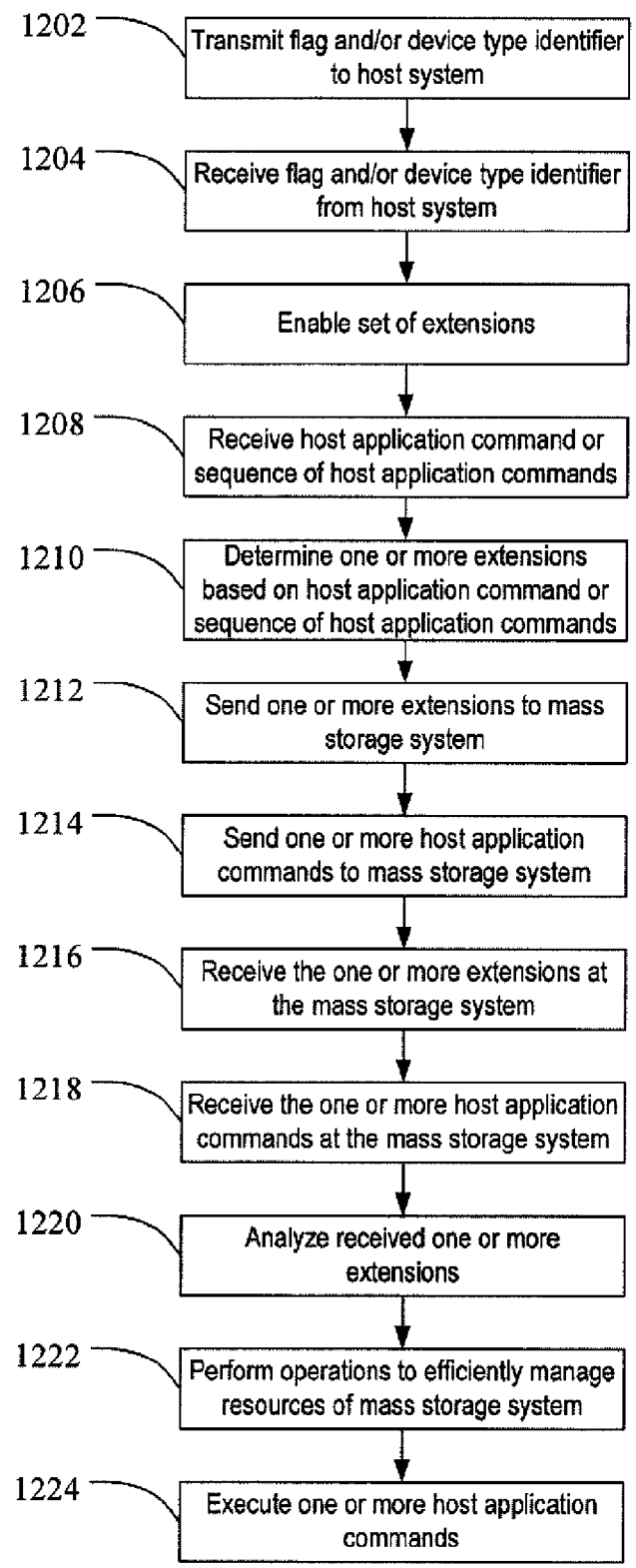
FIG. 12 is a flow chart of one embodiment of a method for implementing extensions to intelligently manage resources of a mass storage system.

FIG. 12 is a flow chart of one embodiment of a method for implementing extensions to intelligently manage resources of a mass storage system. The method 1200 begins at step 1202 with a mass storage system sending at least one of a flag or a device type identifier to a host system. In one implementation, the mass storage system sends the at least one of a flag or a device type identifier to the host system when the mass storage system is first coupled to the host system.

The host system receives the at least one of a flag or a device type identifier from the mass storage system at step 1204, and enables a set of extensions at step 1206 based on the received at least one of a flag or a device type identifier. In one implementation, the enabled set of commands may be a new extension command set. However, in other implementations, the enabled set of extensions may be appended to an existing extension command set.

At step 1208, a host filesystem receives a host application command or a sequence of host application commands to direct to the mass storage system. At step 1210, the host filesystem determines one or more extensions to send to the mass storage system based on the host application command or sequence of host application commands received at step 1108. In one implementation, every time the host filesystem receives a host application command or sequence of host application commands, the host filesystem will attempt to send the same one or more extensions to the mass storage system. However, only when the one or more extensions are enabled will the host filesystem be able to send the one or more extensions to the mass storage system.

As stated above, an extension includes at least one of command sequence information, command information or file attribute information. Command sequence information indicates a sequence of host application commands to the mass storage system that the host will send, or has sent, to the mass storage system. For example, command sequence information may be used to indicate sequences of host application commands such as start of file directory update sequence, end of file directory write sequence, start of atomic update sequence, end of atomic update sequence, or any other type of sequences of host application commands that a host may send to a mass storage system. Sequences of host application commands may be associated with a single file or multiple files. Further, sequences of host application commands may be associated with multiple subsequences, such as multiple sequences of FAT/directory write commands. In some implementations, the memory system may use command sequence information to identify inconsistencies in commands or other sequence of commands that the host has not finished so that the memory system may delete or disregard the inconsistent data or host application commands associated with sequences of host application commands that have not been completed.

Command information indicates a specific host application command to the mass storage system that the host will send, or has sent, to the mass storage system. For example, command information may be used indicate specific host application commands such as a start file write command, a close file command, a delete file command, a FAT/directory write command, a metadata update command, or any other type of host application command that a host may send to a mass storage system.

File attribute information is information that indicates a specific file associated with a host application command that a host has sent, or will send, to a mass storage system. File attribute information may be information such as a filename, a data type, a size of a file, a logical block address of a file, a command sequence identifier, or any other type of information that may indicate a specific file to a mass storage system.

At step 1212, the host filesystem sends one or more extensions associated with the host application command or sequence of host application commands to the mass storage system, and at step 1214, the host system sends to the mass storage system the host application command, or one or more commands of the sequence of host application commands, that includes logical block address information for data associated with the at least one of command sequence information, command information or file information of the one or more extensions. It should be appreciated that the host may send the one or more extensions associated with the host application command or sequence of host application commands to the mass storage system before or after the host sends the actual host application command, or one or more commands of the sequence of host application commands, to the mass storage system so long as the mass storage system can recognize the relationship between the one or more extensions and the host application command or sequence of host application commands.

At step 1216 the mass storage system receives the extension command associated with the host application or sequence of host applications from the host, and at step 1218, the mass storage system receives the host application command or one or more applications of the sequence of host applications from the host.

At step 1220, the mass storage system analyzes the received extension to determine what operations, such as housekeeping operations, the mass storage system can perform to efficiently manage resources of the mass storage system with respect to a host application command or sequence of host applications that the host has sent, or will send, to the mass storage system.

For example, when the mass storage system determines one or more extensions indicate the host has sent, or will send, a start file write command associated with a specific file, or a sequence of host application commands including a start file write command associated with a specific file or multiple files, the mass storage system may perform one or more operations to intelligently mange resources of the mass storage system such as triggering a housekeeping operation within the mass storage system that does not affect data associated with the specific file of the start file write command; triggering garbage collection of update blocks in the mass storage system that are not associated with the specific file of the start file write; triggering storage of data associated with the specific file of the start file write in a form of a contiguous file; triggering an indexing of data associated with the specific file of the start file write command in a form of a contiguous file; and/or triggering the mass storage system to disregard data associated with any unfinished host application commands or sequences of host application commands. For purposes of this application, housekeeping operations are defined to include any operation that is not required to execute a current command or current sequence of commands. For example, with respect to a start file write command, a housekeeping operation may be any operation that is not required to execute the start write command.

When the mass storage system determines one or more extensions indicate the host has sent, or will send, a close file command associated with a specific file, or a sequence of host application commands including a close file command associated with a specific file, the mass storage system may perform one or more operations to intelligently manage resources of the mass storage system such as triggering a housekeeping operation within the mass storage system that affects data associated with the specific file of the close file command, triggering garbage collection of update blocks associated with the specific file of the close file command; triggering storage of data associated with the specific file of the close file command in a form of a contiguous file; and/or triggering an indexing of data associated with the specific file of the close file command in a form of a contiguous file.

When the mass storage system determines one or more extensions indicate the host has sent, or will send, a delete file command associated with a specific file, or a sequence of host application commands including a delete file command associated with a specific file, the mass storage system may perform one or more operations to intelligently manage resources of the mass storage system such as determining logical sectors associated with the specific file of the delete file command can be erased or written with blank data; and/or erasing data associated with the specific file of the delete file command upon a determination that the specific file is stored in file form rather than logical files form.

When the mass storage system determines one or more extensions indicate the host has sent, or will send, a FAT/directory write command, or a sequence of host application commands including a FAT/directory write command, the mass storage system may perform one or more operations to intelligently manage resources of the mass storage system such as determining a chaotic nature of an update determining a logical location of chaotically indexed data; fixing a chaotic block; protecting a chaotic block against closure due to non-sequential accesses; freeing up resources to provide to a file; and/or determining a second application command associated with the received FAT/directory write command and updating file indexing information based on the determined second application command.

When the mass storage system determines one or more extensions indicate the host has sent, or will send, a metadata update command, or a sequence of host application commands including a metadata update command, the mass storage system may perform one or more operations to intelligently manage resources of the mass storage system such as determining a future update will be non-sequential, but not chaotic; and/or allocating an update block to a future garbage collection operation.

At step 1222, the mass storage system performs one or more operations to efficiently manage resources of the mass storage system based on the analysis of the received extension. Finally, at step 1224, the mass storage system executes the host application command or one or more commands of a sequence of host application commands received at step 1218.

From the foregoing, a method and apparatus for implementing extensions to intelligently manage resources of a mass storage system has been described. By analyzing extensions that indicate specific sequences of host application commands, specific host application commands, or specific file associated with host application commands, that a host has sent, or will send, to the mass storage system, the mass storage system may intelligently perform operations that efficiently manage the resources of the mass storage system to reduce the frequency of operations such as data consolidation operations, data collection operations, and data copy operations, thereby increasing the data programming and reading performance of the memory system.

It is therefore intended that the foregoing detailed description be regarded as illustrative rather than limiting, and that it be understood that it is the following claims, including all equivalents, that are intended to define the spirit and scope of this invention.

The invention claimed is:

1. A method of transferring data between a host controller of a host system and a re-programmable non-volatile mass storage system that is coupled with the host controller, the method comprising:
   in the re-programmable non-volatile mass storage system:
   sending at least one of a flag or a device type identifier to the host controller to enable a set of extensions on the host system;
   receiving an extension of an enabled set of extensions from the host controller prior to receiving a specific host application command, wherein the extension indicates to the mass storage system that the host controller will be sending the specific host application command to the mass storage system and where the extension comprises file attribute information indicating a data type for data of an existing file that is associated with the specific host application command;
   receiving the specific host application command that is associated with the extension from the host controller, the specific host application command comprising logical block address information for the data associated with the received file attribute information of the extension; and
   managing resources of the mass storage system based on the data type indicated in the received extension of the enabled set of extensions.

2. The method of claim 1, wherein the file attribute information further comprises at least one of a filename, a size of a file, or a logical block address.

3. The method of claim 1, wherein the enabled set of extensions is an extension command set.

4. The method of claim 1, wherein the received extension is appended to a received command of a command set.

5. The method of claim 1, wherein the received extension comprises a start file write command comprising file attribute information and wherein managing resources of the mass storage device based on the data type indicated in the received extension comprises at least one of:
   triggering a housekeeping operation that does not affect data associated with the file attribute information;
   triggering garbage collection of update blocks not associated with the file attribute information;
   triggering storage of data in the host application command in a form of a contiguous file; or
   triggering an indexing of data in the host application command in a form of a contiguous file.

6. The method of claim 1, wherein the received extension comprises a close file command comprising file attribute information and wherein managing resources of the mass storage device based on the data type indicated in the received extension comprises at least one of:
  triggering a housekeeping operation that affects data associated with the file attribute information;
  triggering garbage collection of update blocks associated with the file attribute information;
  triggering the storage of data associated with the application host command in a form of a contiguous file; or
  triggering an indexing of data associated with the application host command in a form of a contiguous file.

7. The method of claim 1, wherein the received extension comprises a FAT/directory write command and wherein managing resources of the mass storage device based on the data type indicated in the received extension comprises at least one of:
  determining a chaotic nature of an update;
  determining a logical location of chaotically indexed data;
  fixing a chaotic block;
  protecting a chaotic block against closure due to non-sequential accesses; or
  determining a second command associated with the received directory write command and updating file indexing information based on the determined second command.

8. The method of claim 1, wherein the received extension comprises a delete file command comprising file attribute information and wherein managing resources of the mass storage device based on the data type indicated in the received extension comprises:
  erasing data associated with the file attribute information when it is determined that a file is stored in file form and not logical files.

9. The method of claim 1, wherein the received extension comprises a metadata update command and wherein managing resources of the mass storage device based on the received extension comprises at least one of:
  determining a future update will be non-sequential, but not chaotic; or
  allocating an update block to a future garbage collection operation.

10. The method of claim 1, wherein the mass storage device receives the extension before the mass storage device it receives the host application command.

11. The method of claim 1, wherein the received extensions of the enabled set of extensions comprises a start logical block address.

12. The method of claim 1, wherein the re-programmable non-volatile mass storage system is embedded in the host system.

13. The method of claim 1, wherein the re-programmable non-volatile mass storage system is positioned entirely within in a removable storage device configured to be removably connected with the host system.

14. A method of transferring data between a host controller of a host system and a re-programmable non-volatile mass storage system that is coupled to the host controller, the method comprising:
  in the host controller:
    directing an extension of an enabled set of extensions to a mass storage system prior to directing a specific host application command to the mass storage device, wherein the extension indicates to the mass storage system that the host controller will be sending the specific host application command to the mass storage system and the extension comprises file attribute information indicating a data type for data of an existing file that is associated with the host application command; and
    directing the specific host application command that is associated with the extension to the mass storage system, the specific host application command comprising logical block address information for the data associated with the file attribute information of the extension.

15. The method of claim 14, wherein file attribute information further comprises at least one of a filename, a size of a file, or a logical block address.

16. The method of claim 14, further comprising:
  receiving at least one of a flag or a device type identifier from the mass storage system; and
  enabling a set of extensions based on the received at least one of a flag or a device type identifier.

17. The method of claim 16, wherein enabling a set of extensions comprises:
  enabling an extension command set.

18. The method of claim 14, wherein the extension of the enabled set of extensions is appended to a command of a command set.

19. The method of claim 14, wherein directing an extension of the enabled set of extensions to the mass storage system comprises:
  transmitting a start file write command comprising file attribute information to the mass storage system to trigger the mass storage system to manage resources of the mass storage system based on the received start file write command.

20. The method of claim 19, wherein transmitting the start file write command to the mass storage system causes the mass storage system to perform at least one of:
  triggering a housekeeping operation that does not affect data associated with the file attribute information;
  triggering garbage collection of update blocks not associated with the file attribute information;
  triggering storage of data in the host application command in a form of a contiguous file; or
  triggering an indexing of data in the host application command in a form of a contiguous file.

21. The method of claim 14, wherein directing an extension of the enabled set of extensions to the mass storage system comprises:
  transmitting a close file command comprising file attribute information to the mass storage device to trigger the mass storage system to manage resources of the mass storage system based on the received close file command.

22. The method of claim 21, wherein transmitting the close file command to the mass storage system causes the mass storage to perform at least one of:
  triggering a housekeeping operation that affects data associated with the file attribute information;
  triggering garbage collection of update blocks associated with the file attribute information triggering the storage of data associated with the application host command in a form of a contiguous file; or
  triggering an indexing of data associated with the application host command in a form of a contiguous file.

23. The method of claim 14, wherein directing an extension of the enabled set of extensions to the mass storage system comprises:
  transmitting a FAT/directory write command to the mass storage system to trigger the mass storage device to manage resources of the mass storage system based on the received directory write command.

24. The method of claim 23, wherein transmitting the FAT/directory write command to the mass storage system causes the mass storage system to perform at least one of:
   determining a chaotic nature of an update;
   determining a logical location of chaotically indexed data;
   fixing a chaotic block;
   protecting a chaotic block against closure due to non-sequential accesses; or
   determining a second command associated with the receiving directory write command and updating file indexing information based on the determined second command.

25. The method of claim 14, wherein directing an extension of the enabled set of extensions to the mass storage system comprises:
   transmitting a delete file command comprising file attribute information to the mass storage device to trigger the mass storage system to manage resources of the mass storage system based on the received delete file command.

26. The method of claim 25, wherein transmitting the delete file command to the mass storage system causes the mass storage system to perform:
   erasing data associated with the file attribute information when it is determined that a file is stored in file form and not logical files.

27. The method of claim 14, wherein directing an extension of the enabled set of extensions to the mass storage system comprises:
   transmitting a start metadata update command to the mass storage system to trigger the mass storage system to manage resources of the mass storage system based on the received start metadata update command.

28. The method of claim 27, wherein transmitting the start metadata update command to the mass storage system causes the mass storage system to perform at least one of:
   determining a future update will be non-sequential, but not chaotic; or
   allocating an update block to a future garbage collection operation.

29. The method of claim 14, wherein directing an extension of the enabled set of extensions to the mass storage system comprises:
   transmitting an open file command comprising file attribute information to the mass storage device to trigger the mass storage device to manage resources of the mass storage device based on the received open file command.

30. The method of claim 29, wherein transmitting the open file command to the mass storage system causes the mass storage system to perform at least one of:
   triggering a housekeeping operation that does not affect data associated with the file attribute information
   triggering garbage collection of update blocks not associated with the file attribute information;
   triggering the storage of data associated with the application host command in a form of a contiguous file; or
   triggering an indexing of data associated with the application host command in a form of a contiguous file.

31. The method of claim 14, wherein the extensions of the enabled set of extensions directed to the mass storage device further comprises a start logical block address.

32. The method of claim 14, wherein the re-programmable non-volatile mass storage system is embedded in the host system.

33. The method of claim 14, wherein the re-programmable non-volatile mass storage system is positioned entirely within in a removable storage device configured to be removably connected with the host system.

34. A storage system comprising:
   non-volatile memory; and
   a controller in communication with the non-volatile memory, the controller configured to:
      examine a received extension of an enabled set of extensions from a host controller prior to the controller receiving a specific host application command, wherein the extension indicates to the storage system that the host controller will be sending the specific host application command to the storage system and the extension comprises file attribute information indicating a data type for data of an existing file that is associated with the specific host application command;
      examine the specific host application command that is associated with the extension, where the host application command is received from the host controller of a host system and the specific host application command comprises logical block address information for the data associated with the received file attribute information of the extension; and
      manage resources of the storage system within the non-volatile memory based on the data type indicated in the received extension of the enabled set of extensions.

35. The storage system of claim 34, wherein the controller is further operative to send at least one of a flag or a device type identifier to the host system to enable a set of extensions on the host system.

36. The storage system of claim 34, wherein the file attribute information further comprises at least one of a filename, a size of a file, or a logical block address.

37. The storage system of claim 34, wherein the enabled set of extensions is an extension command set.

38. The storage system of claim 34, wherein the received extension is appended to a received command of a command set.

39. The storage system of claim 34, wherein the storage system receives the extension before the storage system it receives the host application command.

40. The storage system of claim 34, wherein the received extensions of the enabled set of extensions comprises a start logical block address.

41. The storage system of claim 34, wherein the storage system is embedded in the host system.

42. The storage system of claim 34, wherein the storage system is a removable storage device configured to be removably connected with the host system.

43. The storage system of claim 34, wherein the controller of the storage system is embedded in the host system.

44. The storage system of claim 43, wherein the non-volatile memory of the storage system is positioned in a removable storage device configured to be removably connected with the host system.

45. The storage system of claim 34, wherein the storage system is positioned entirely in a removable storage device configured to be removably connected with the host system.

* * * * *